US007860436B2

(12) United States Patent
Sano et al.

(10) Patent No.: US 7,860,436 B2
(45) Date of Patent: Dec. 28, 2010

(54) IMAGE FORMING APPARATUS WITH TONER SUPPLYING ROLLER

(75) Inventors: Tetsuo Sano, Toyokawa (JP); Yohei Nakade, Okazaki (JP); Ichiro Demizu, Toyonaka (JP); Yoshikazu Aoki, Toyokawa (JP); Yuusuke Okuno, Toyokawa (JP); Takuya Okada, Okazaki (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 750 days.

(21) Appl. No.: 11/808,880

(22) Filed: Jun. 13, 2007

(65) Prior Publication Data

US 2007/0286647 A1 Dec. 13, 2007

(30) Foreign Application Priority Data

Jun. 13, 2006 (JP) ............................ 2006-163053

(51) Int. Cl.

| | |
|---|---|
| ***G03G 15/08*** | (2006.01) |
| ***G03G 15/09*** | (2006.01) |
| ***G03G 13/08*** | (2006.01) |
| ***B05C 1/08*** | (2006.01) |
| ***F16C 13/00*** | (2006.01) |

(52) U.S. Cl. ....................... 399/281; 399/265; 399/272; 399/279; 492/17; 492/18; 492/56; 492/59; 430/123.3

(58) Field of Classification Search ................. 399/279, 399/281, 286

See application file for complete search history.

(56) References Cited

U.S. PATENT DOCUMENTS

| | | | | |
|---|---|---|---|---|
| 5,557,060 | A * | 9/1996 | Okada et al. | 399/284 |
| 5,708,921 | A * | 1/1998 | Yagi et al. | 399/98 |
| 5,937,236 | A * | 8/1999 | Kim | 399/103 |
| 6,149,564 | A * | 11/2000 | Nozawa et al. | 492/30 |
| 6,810,227 | B2 | 10/2004 | Sakata et al. | |
| 6,868,247 | B2 * | 3/2005 | Sato et al. | 399/281 |
| 7,388,036 | B2 * | 6/2008 | Sasaki et al. | 521/131 |
| 2001/0036376 | A1 | 11/2001 | Yamazaki et al. | |
| 2002/0039494 | A1 | 4/2002 | Machida et al. | |
| 2003/0215269 | A1 * | 11/2003 | Kayahara et al. | 399/297 |
| 2005/0220499 | A1 * | 10/2005 | Kawahara et al. | 399/281 |

FOREIGN PATENT DOCUMENTS

| | | |
|---|---|---|
| EP | 0 967 528 | 12/1999 |
| JP | 11-282243 | 10/1999 |

(Continued)

OTHER PUBLICATIONS

Notification of Reason(s) for Refusal in JP 2006-163053 dated Apr. 15, 2008, and Translations thereof.

*Primary Examiner*—David M Gray
*Assistant Examiner*—Francis Gray
(74) *Attorney, Agent, or Firm*—Buchanan Ingersoll & Rooney PC

(57) ABSTRACT

A developing device has a developer bearing member, a housing adapted to accommodate a developer, and a supply roller adapted to supply the developer within the housing for the developer bearing member. The supply roller has an outer circumferencial foam layer made of resin or rubber. The foam layer has an air permeability of 150-200 ml/cm$^2$/s, a hardness of 50-200 N, and an average cell density of 20-40 per 25 mm width.

17 Claims, 10 Drawing Sheets

FOREIGN PATENT DOCUMENTS

| | | | | |
|---|---|---|---|---|
| JP | 2000-010404 | | | 1/2000 |
| JP | 2002-055521 | | | 2/2002 |
| JP | 2003012853 | A | * | 1/2003 |
| JP | 2003-073441 | | | 3/2003 |
| JP | 2003-192756 | | | 7/2003 |
| JP | 2003-228230 | A | | 8/2003 |
| JP | 2004-170827 | | | 6/2004 |
| JP | 2006154537 | A | * | 6/2006 |
| JP | 2006199869 | A | * | 8/2006 |

* cited by examiner

FIG. 9

| | Peameability (ml/cm$^2$/s) | Hardness (N) | Average Cell Density (/25mm) | Evaluation | Cracking | Implantation | Clogging | Scraping Ability | Supply Stability |
|---|---|---|---|---|---|---|---|---|---|
| Invention Example 1 | 161 | 58.8 | 35 | A | A | A | A | A | A |
| Invention Example 2 | 155 | 65.2 | 35 | A | A | A | A | A | A |
| Invention Example 3 | 125 | 127.5 | 40 | A | A | A | A | A | A |
| Invention Example 4 | 189 | 78.5 | 32 | A | A | A | A | A | A |
| Comparative Example 1 | 107 | 156.9 | 41 | B | A | B | B | A | A |
| Comparative Example 2 | 170 | 49 | 30 | B | A | A | A | A | B |
| Comparative Example 3 | 92 | 225.6 | 48 | B | B | B | C | A | A |
| Comparative Example 4 | 206 | 19.6 | 25 | B | A | A | A | B | B |
| Comparative Example 5 | 180 | 100 | 25 | B | A | A | A | B | A |
| Comparative Example 6 | 123 | 160 | 45 | B | B | B | A | A | A |
| Comparative Example 7 | 110 | 180 | 33 | B | A | A | C | A | A |
| Comparative Example 8 | 150 | 68 | 43 | B | A | B | A | A | A |
| Comparative Example 9 | 115 | 210 | 40 | B | B | A | B | A | A |
| Comparative Example 10 | 195 | 45 | 27 | B | A | A | A | B | B |
| Comparative Example 11 | 210 | 50 | 31 | B | A | A | A | A | B |
| Comparative Example 12 | 130 | 205 | 37 | B | B | A | A | A | A |

FIG. 10A

| | HH | NN | LL |
|---|---|---|---|
| DISCHARGE BIAS (volts) | 0 | 0 | 0 |
| SCRAPING ABILITY | A | B | C |

FIG. 10B

| | HH | NN | LL |
|---|---|---|---|
| DISCHARGE BIAS (volts) | – | 50 | 100 |
| SCRAPING ABILITY | – | A | A |

IMAGE FORMING APPARATUS WITH TONER SUPPLYING ROLLER

RELATED APPLICATION

This application is based upon the Japanese Patent Application Serial No. 2006-163053, the entire disclosure of which is incorporated herein by reference.

FIELD OF THE INVENTION

The present invention relates to an image forming apparatus such as a copy machine, a printing machine, a facsimile machine and a multi-function machine equipped with functions of those machines. The present invention also relates to a developing device for developing an electrostatic latent image on an electrostatic latent image bearing member of the image forming apparatus. The present invention further relates to a developer supply roller for supplying developer, such as toner particles, to a developer bearing member of the image forming apparatus.

BACKGROUND OF THE INVENTION

An electrophotographic image forming apparatus includes a developing device having a developer bearing member which brings developer, such as toner particles, onto an electrostatic latent image bearing member for development and a toner supply roller which is disposed in contact with the developer bearing member and supplies toner particles to and collects them from the developer bearing member at the contact area thereof.

The United States Patent Application No. 2001/0036376 A1 discloses the toner supply roller which includes a core bar and a form layer disposed around the circumference of the core bar. The circumferential layer is made of resin foam, such as urethane foam or rubber foam, which can cause certain disadvantages due to the property of the material. For example, the foam layer with a lower air permeability is incapable of releasing toner particles accommodated therein. The unreleased accommodated toner particles tend to cause an aggregation within the foam layer, which loses its elasticity and thereby increases a frictional contact against the developer bearing member and also toner particles borne thereon. This results in an unwanted adhering of the toner particles on the resultant images.

The foam layer with a higher air permeability, on the other hand, has a less scraping ability for scraping toner particles from the developer bearing member. The low scraping ability results in that the toner particles on the developer bearing member is unlikely to be replaced by another toner particles. This deteriorates the toner particles on the developer bearing member. Also, this causes the toner particles to be forced onto the surface of the developer bearing member, forming an unwanted toner film, i.e., so-called "filming", on the developer bearing member.

The foam layer with a lower hardness is incapable of strongly forcing toner particles onto the developer bearing member, which provides a less amount of toner onto the developer bearing member and therefore causes images with insufficient densities. In addition, the lower hardness of the foam layer provides insufficient scraping of the developer bearing member, which causes the unwanted filming.

The foam layer with a higher hardness tends to be strongly forced against the developer bearing member, which in turn damages the toner particles, such as cracking, and also forces external additives into the surface of the toner particle, i.e., unwanted implantation of the additives into toner particles.

The foam layer with a lower average cell-density makes fewer contacts with the developer bearing member, which exercises a low scraping ability of toner and thereby results in the deterioration of the toner particles and the unwanted filming on the developer bearing member.

The foam layer with a higher average cell-density makes a larger number of contacts with the developer bearing member, which tends to damage the toner particles.

As discussed above, the foam layer of the supply roller needs appropriate air permeability, hardness, and average cell-density. Therefore, the present invention is to provide suitable properties to the toner supply roller, thereby preventing the generation of filming and then allowing the image forming apparatus to produce high quality images free of unwanted toner

SUMMARY OF THE INVENTION

According to the present invention, a developing device has a developer bearing member, a housing adapted to accommodate a developer, and a supply roller adapted to supply the developer within the housing for the developer bearing member. The supply roller has an outer circumferencial foam layer made of resin or rubber. The foam layer has an air permeability of 150-200 ml/cm$^2$/s, a hardness of 50-200 N, and an average cell density of 20-40 per 25 mm width.

BRIEF DESCRIPTION OF THE DRAWINGS

The present invention will become more fully understood from the detailed description and the accompanying drawings, wherein:

FIG. 9 is a table showing the test result of Test 1; and

FIGS. 10A and 10B are tables showing the test result of Test 2.

DETAILED DESCRIPTION OF THE PREFERRED EMBODIMENTS

An embodiment of the present invention will now be described in detail with reference to the attached drawings. Although terminologies indicating specific directions and/or locations, such as "on", "under", "right", "left" and phrases including such terminologies will be used as necessary in the following descriptions, this intends to provide readers with a better understanding of the invention and those terminologies and phrases should not be used to limit the technical scope of the present invention.

Figure 1:
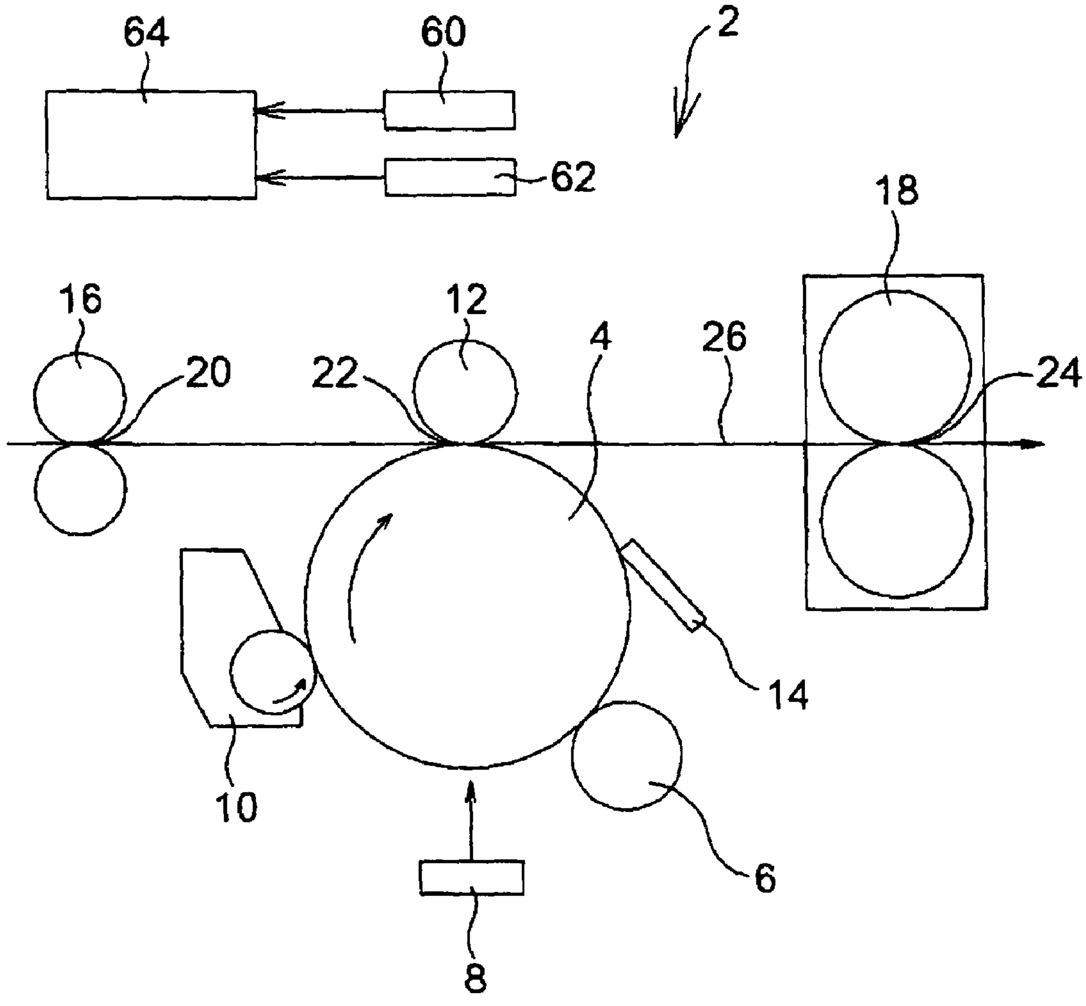
FIG. 1 is a schematic elevational view showing a general structure of the image forming apparatus according to the present invention.

FIG. 1 schematically shows a general structure of an image forming apparatus 2 according to the embodiment of the present invention. For clarity, the housing of the image forming apparatus is not illustrated in the drawing.

The image forming apparatus 2 is an electrophotographic image forming apparatus which may be a copying machine, a printer, a facsimile or a multi-function peripheral equipped with those functions in combination. While various types of electrophotographic image forming apparatuses have been proposed so far, the illustrated image forming apparatus is a monochrome image forming apparatus with a single developing device. The present invention is not limited to the embodiment but also applied to a various image forming apparatus, including a color image forming apparatus of so-called tandem type or the 4-cycle type color image forming apparatus.

The image forming apparatus 2 includes an electrostatic latent image bearing member. In this embodiment, the image bearing member is made of a cylindrical photosensitive member 4 in the form of drum. Disposed around the photosensitive member along the direction in which the photosensitive member rotates (i.e., the clockwise direction in FIG. 1) are a charger device 6, an exposure device 8, a developing device 10, a transfer device or roller 12 and a cleaning member 14 in this order. The transfer roller 12 is mounted in contact with the photosensitive member 4 to define a contact area or nip region therebetween.

According to the embodiment, the cleaning member 14 is made of a blade in the form of elongate plate and is so mounted that its longitudinal edge is in contact with the outer circumference surface of the photosensitive member 4. The cleaning member 14, however, is not limited to such blade and a rotatable or fixed brush and roller may be used instead.

A transportation path 26 extends from a paper feeder not shown to a paper receiver not shown via a nip region 20 defined between paired paper feeder rollers 16, the transfer region 22 and a nip region 24 between paired fixing rollers 18.

The image forming apparatus 2 includes a temperature sensor 60 as a temperature sensing means which senses the atmospheric temperature inside the image forming apparatus 2 and a humidity sensor 62 as a humidity sensing means which senses the humidity inside the image forming apparatus 2.

The image forming apparatus 2 further includes a controller 64 which controls a discharge voltage or bias $V_{RB}$ which will be described later in accordance with the temperature sensed by the temperature sensor 60 and the humidity sensed by the humidity sensor 62. The details of the control for controlling the discharge bias $V_{RB}$ by the controller 64 will be described later.

A typical image forming operation will now be briefly described. The charger device 6 electrically charges the outer circumference surface of the photosensitive member 4 being rotated at a predetermined circumferential velocity. The exposure device 8 projects light corresponding to image data onto the charged outer circumference surface of the photosensitive member 4 to from an electrostatic latent image thereon. The electrostatic latent image is then visualized with toner particles of a developer supplied from the developing device 10. The resultant toner image formed on the photosensitive member 4 is transported into the transfer region 22 by the rotation of the photosensitive member 4.

In synchronism with this toner image formation, a recording medium such as paper is transported from the paper feeder into the transportation path 26 and then conveyed to the transfer region 22 by the rotation of rollers 16. In the transfer region 22, the toner image on the photosensitive member 4 is transferred onto the paper. The paper bearing the transferred toner image is transported toward the downstream side on the transportation path 26, and after fixing of the toner image on the paper by the fixing rollers 18, discharged onto the paper receiver.

The toner particles remaining on the photosensitive member 4 without being transferred onto the paper, upon arrival at a contact area between the photosensitive member 4 and the cleaning member 14, are scraped off by the cleaning member 14 and accordingly removed from the outer circumference surface of the photosensitive member 4.

Figure 2:
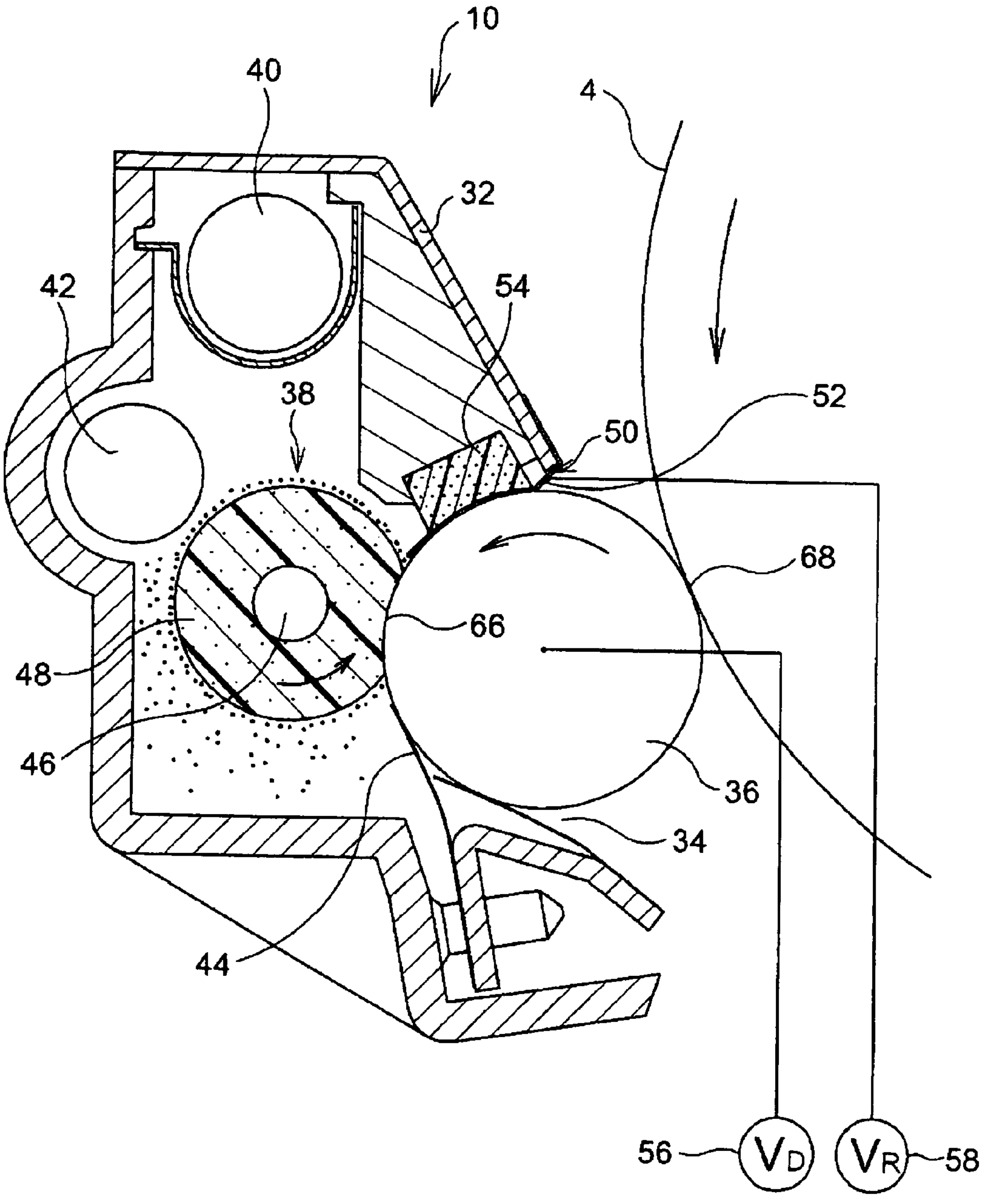
FIG. 2 is a cross sectional view of a developing device of the image forming apparatus of FIG. 1.

The structure of the developing device 10 will now be described in detail. As shown in FIG. 2, the developing device 10 includes a developing roller 36 serving as a developer bearing member, a toner supply roller 38 and a housing 32 which houses the developing roller 36 and the toner supply roller 38.

The toner is a so-called single component negatively charged toner, for example. An external additive containing titanate strontium or the like may be added to the toner. Each toner particle has a diameter of about 6-7 μm but it is not limited thereto. A positively charged toner may also be used instead for the present invention.

The developing roller 36 and the toner supply roller 38 are disposed in contact with each other so as to rotate about respective parallel shafts. The developing roller 36 and the toner supply roller 38 are drivingly linked to a drive source not shown, and by the driving of the drive source, rotate in the counterclockwise direction in FIG. 2. The specific structure of the toner supply roller 38 will be described later.

The developing device 10 further includes two transportation members 40 and 42, preferably in the form of screws for the circulation and mixing of toner particles inside the housing 32.

The housing 32 has an opening 34 for receiving the developing roller 36 which supplies toner particles onto the photosensitive member 4.

A discharge member 50, which is disposed in the vicinity of the opening 34 of the housing 32, includes an electrically conductive member 52 disposed in contact with the circumference of the developing roller 36 and a forcing member 54 which forces the conductive member 52 against the circumference of the developing roller 36.

The conductive member 52, preferably in the form of sheet, is secured at its one end to an upper edge of the opening 34. The remaining portion of the conductive member 52 is placed on the outer circumference surface of the developing roller 36. The conductive member 52 is selected from electrically conductive materials capable of being charged to the same polarity as the toner particle, such as polytetrafluoroethlene.

The forcing member 54 is supported by the housing 32 so that it cooperates with the developing roller 36 to hold the electrically conductive member 52 therebetween. Preferably, the forcing member 54 is made of, for example, resin foam, rubber foam, or felt. In this embodiment, the forcing member 54 is made of urethane foam.

A biasing means or power source 56 is connected to the developing roller 36 so that a developing bias is applied to the developing roller 36. Another biasing means or power source 58 is connected to the conductive member 52 so that a discharge bias voltage $V_R$ is applied to the conductive member 52, having a different polarity than that of the developing voltage $V_D$. The bias voltages $V_D$ and $V_R$ will be described later.

In operation of the developing device 10 so constructed, the toner particles within the housing 32, in particular around the supply roller 38, are circulated in the counterclockwise direction in FIG. 2 and supplied onto the developing roller 36 in a supply and collect region 66 where the developing roller 36 and the supply roller 38 are opposed to each other by the rotation of the supply roller 38. The toner particles supplied to the developing roller 36 are electrically charged, but not fully charged, by the frictional contacts with the developing roller 36 and the supply roller 38.

The toner particles on the developing roller 36 are then transported by its rotation into a restriction region where a restriction member 44 contacts the circumferential surface of the developing roller 36. In the restriction region, the toner layer is restricted to a predetermined thickness and the toner particles are fully charged electrically by the frictional contact with the restriction member. The fully charged toner particles are transported by the rotation of the developing roller 34 into the developing region 68 where the developing roller 34 faces the photosensitive member 4. In this region 68, the toner particles adhere to the electrostatic latent image, in particular imaging region thereof, to form the visualized toner image on the photosensitive member 4.

The toner particles remaining on the developing roller 36 passed through the developing region 68, without being transferred to the photosensitive member, are discharged by the contact with the conductive member 52 so that they can easily be removed from the developing roller. The discharged toner particles are then transported into the supply and collect region where they are collected from the developing roller by the supply roller 38.

The structure of the supply roller 38 will now be described in detail. The supply roller 38 is formed by a cylindrical core bar 46 and a foam layer 48 disposed on the outer circumference of the core bar 46.

Preferably, the core bar 46 is made of iron, stainless steel, aluminum or resin, for example. Also preferably, the surface of the core bar 46 is plated to prevent corrosion thereof.

Preferably, the foam layer 48 is made of resin foam or rubber foam. Among other thing, polyurethane foam is most preferably used due to its excellent durability. Other materials including thermoset resin such as epoxy resin and acrylic resin and foam of thermoplastic resin such as polyethylene and polystyrene are also used for the foam layer 48.

Figure 3:
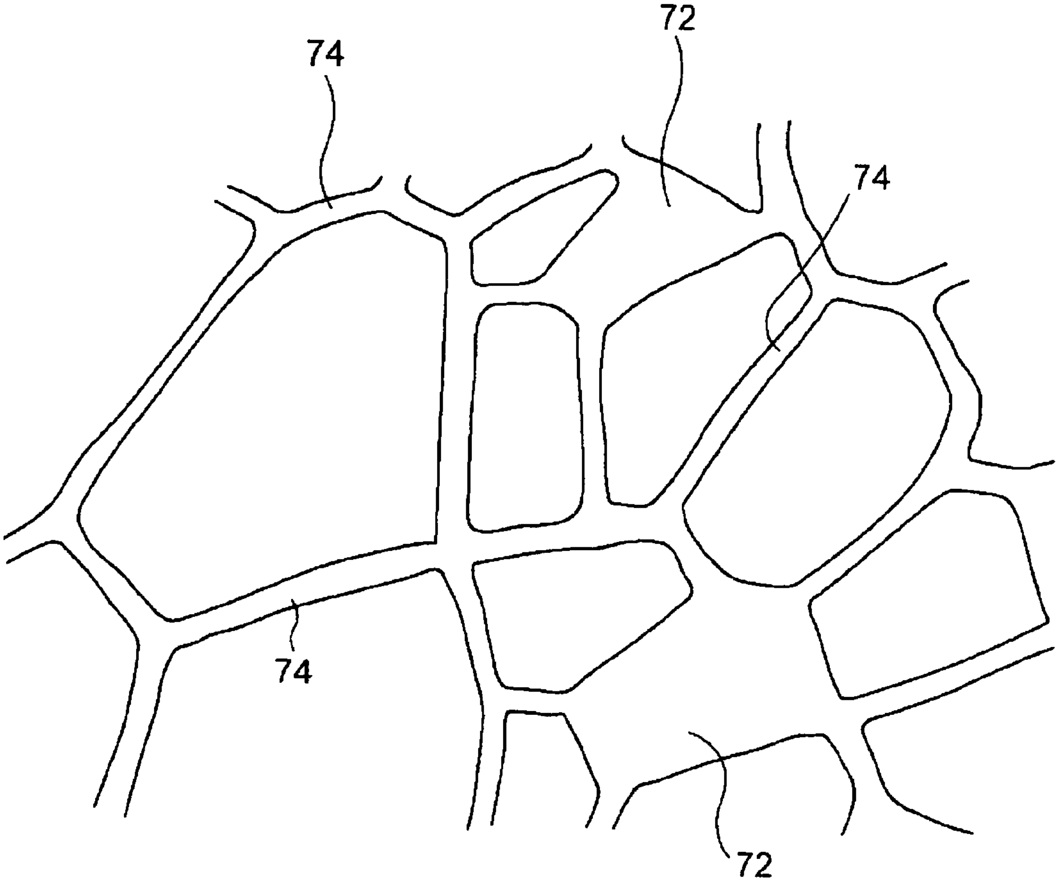
FIG. 3 is an enlarged partial drawing showing cell structures of the foam layer.

As shown in FIG. 3, the foam layer 48 includes a large number of highly-densed ultra small neighboring cells. Preferably, an average effective diameter of the cells ranges about 300-1,200 μm. A partition 72 or a pillar 74 may exist between neighboring cells. Typically, the neighboring cells are communicated to each other through opening or openings defined in the diaphragms 72, openings between the pillars 74 or openings between the diaphragms 72 and the associated pillars 74.

Preferably, the air permeability of the foam layer 48, which is measured in accordance with the test method of JIS-L1096A, ranges from 120 $ml/cm^2/s$ to 200 $ml/cm^2/s$, more preferably 140 $ml/cm^2/s$ to 180 $ml/cm^2/s$. The foam layer of which air permeability is equal to or more than 120 $ml/cm^2/s$ prevents the toner particles from being unnecessarily retained within the foam layer. Also, the foam layer of which air permeability is equal to or more than 200 $ml/cm^2/s$ prevents the decrease in scraping ability against the toner particles on the developing roller 36, which would otherwise cause unwanted deterioration of the toner particles and the filming on the developing roller 36.

The air permeability of the foam layer 48 may be controlled by various ways, for example, by introducing flammable gas into expanded foam to burn out partitions around the cells of the foam and thereby to form cell-communication openings.

Preferably, the hardness of the foam layer 48, which can be measured in accordance with JIS-K6400, ranges from 50 N to 200 N, more preferably from 50 N to 100N. The hardness of 50 N or more allows the foam layer 48 to be sufficiently pressed against the developing roller 36, which provides an enhanced scraping agility to the foam layer. The hardness of 200 N or less inhibits the foam layer 48 to be pressed excessively, which prevents the deterioration of toner particles, such as cracking thereof or implantation of external additives therein.

The hardness of the foam layer 48 may be controlled by various ways, such as by the selection of the material of the foam layer or by adjusting the amount of the foaming agent to the added into the foam layer.

Preferably, the average cell density of the foam layer 48, which is defined by the average number of cells per 25 mm width, ranges from 30 to 40.

The average cell density of 30 cells per 25 mm width or more allows the foam layer 48 to form a sufficient number of contacts with the developing roller 48, which ensures a necessary scraping ability of the foam layer. The average cell density of 40 cells per 25 mm width or less inhibits unnecessary contacts of the foam layer with the developing roller, which prevents the deterioration of toner particles, such as cracking thereof or implantation of external additives therein.

The average cell density can be controlled by various ways, such as by adjusting the amount of foaming agent to be added into the foam layer.

The foam layer 48 may contain an electrically conductive substance or substances, if necessary, such as electronic conducting substance (for example, conductive carbon, tin oxide and zinc oxide), an ionic conducting substance (for example, sodium perchlorate, lithium perchlorate and various quaternary ammonium salt). The conductivity may be provided to the foam layer 48 by immersing the foam layer into a liquid containing a conducting substance or by mixing the conductive material with the original materials of the foam layer before expansion.

For example, according to the immersing method for providing conductivity to the foam layer, an electrically conductive substance or electronic conducting filler (for example, carbon powder such as carbon black and graphite, metallic powder of nickel, copper, silver or the like, or a conductive metal oxide) is mixed with latex obtained by stably dispersing in water solid resin such as polyurethane resin, acrylic resin, NBR, CR and polyester resin, or with liquid resin of polyurethane, silicon or the like. Foam of polyurethane or the like is impregnated with the liquid raw material so prepared and then dried or cross-linked to obtain the foam member including the electronic conductive substance.

Next, detailed discussions will be made to the control of the discharge bias $V_{RB}$. The discharge bias $V_{RB}$ is the voltage to be applied to the conductive member 52 for discharging electricity of the toner particles on the portion of the developing roller 36 passing through the contact region between the developing roller 36 and the conductive member 52 of the discharge member 50.

The discharge bias $V_{RB}$ is a voltage difference $V_R-V_D$ between the discharge bias voltage $V_R$ applied to the conductive member 52 from the power source 58 and the developing voltage $V_D$ applied to the developing roller 36 from the power source 56. The discharge bias has a certain polarity that is different from that of the toner particles. For example, when the toner particle is charged with negative polarity, the discharge bias $V_{RB}$ has a positive polarity. This results in that the toner particles lose electric charge at least in part by the contact with the conductive member 52 and thereby are easy to be removed from the developing roller 36.

Figure 4:
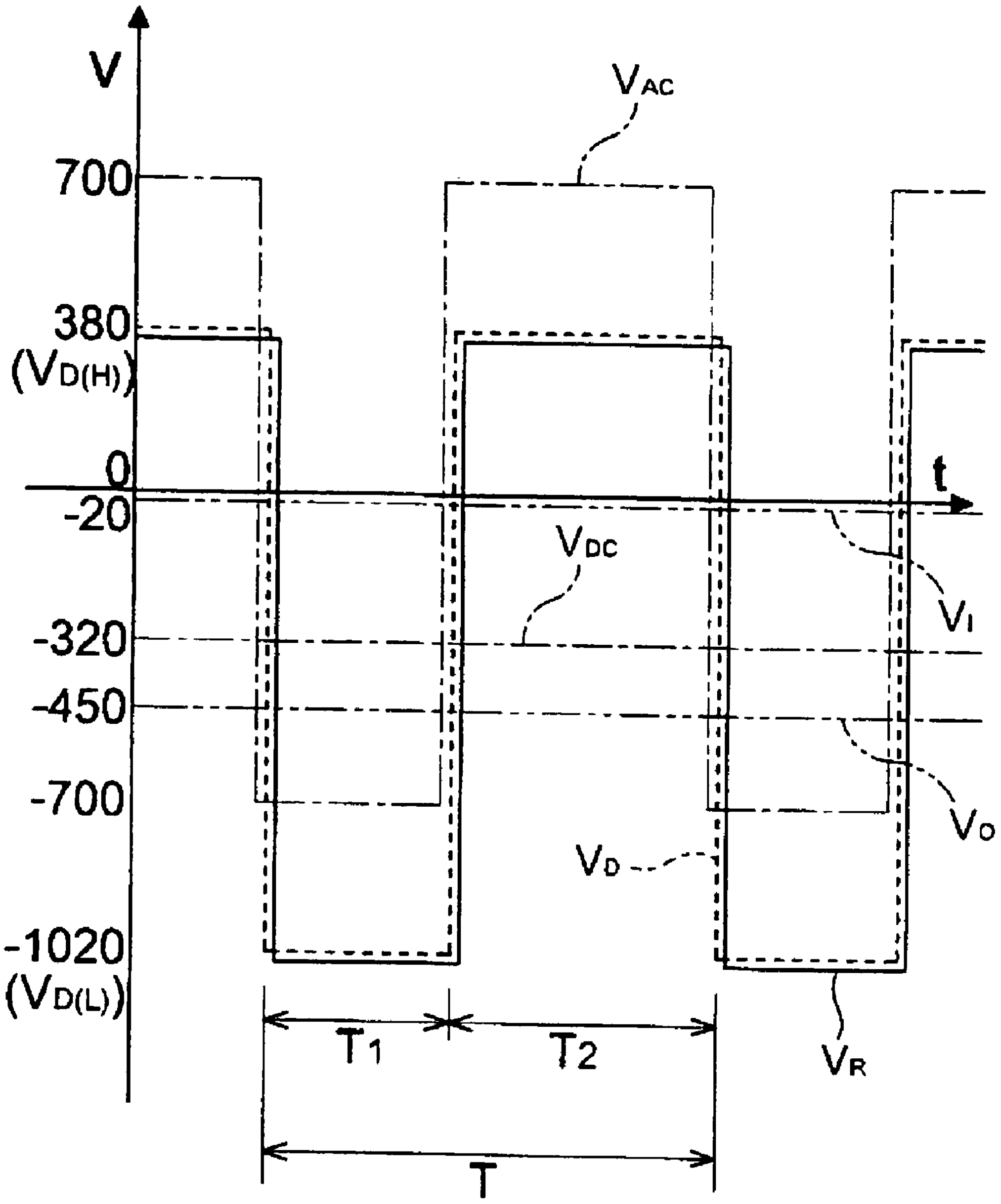
FIG. 4 is a diagram showing a graph of a discharge bias $V_R$ in the absence of discharge bias applied.
Figure 5:
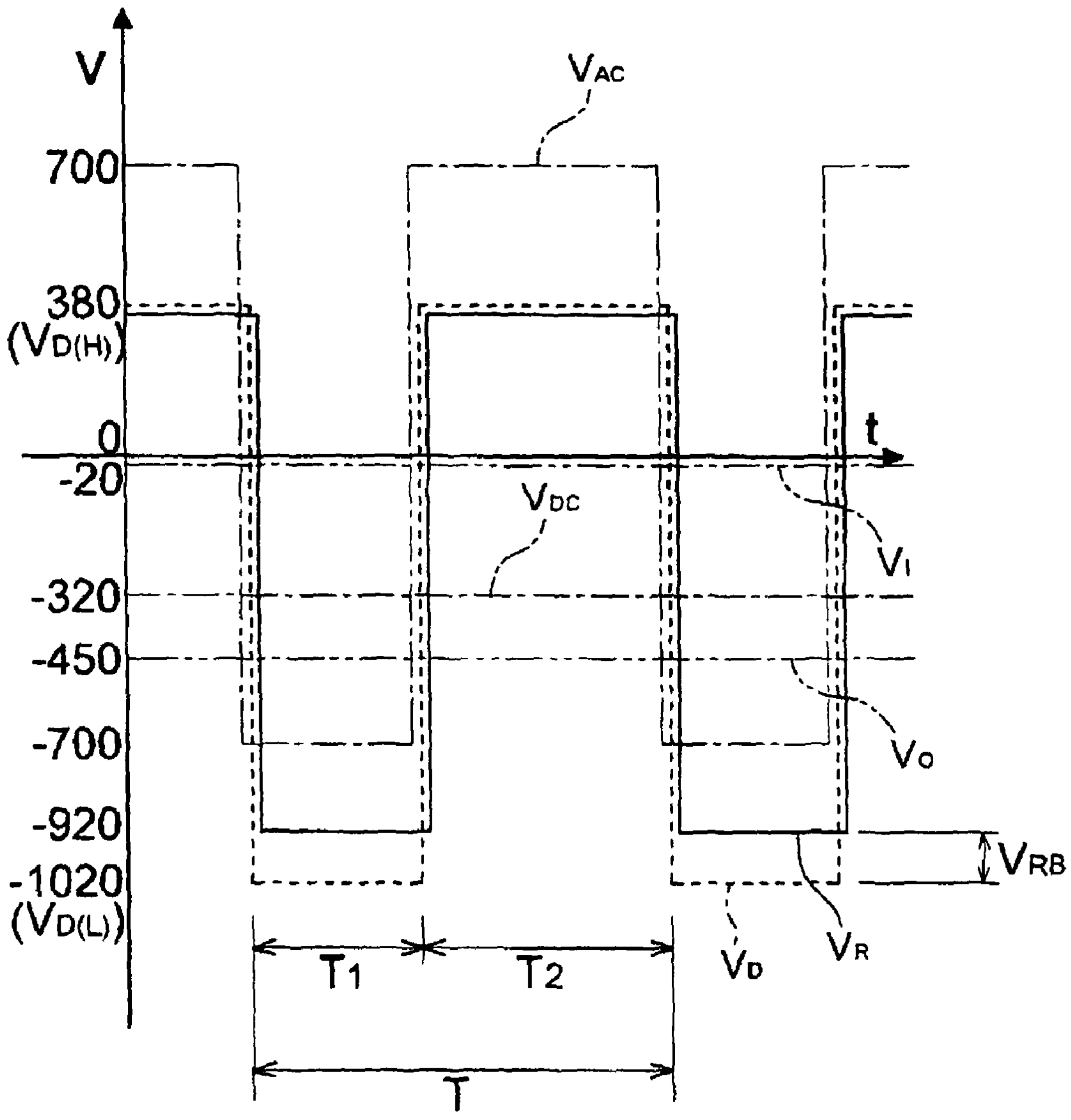
FIG. 5 is a diagram showing a graph of the discharge bias $V_R$ when a developing voltage $V_D$ takes the minimum voltage $V_{D(L)}$.

In this embodiment, as shown in FIGS. 4 and 5, the developing voltage $V_D$ is a superposition of a DC voltage $V_{DC}$ of −320 volts, for example, and an AC voltage $V_{AC}$ which alternately changes between +700 volts and −700 volts, for example. In this instance, the developing voltage $V_D$ varies between −1,020 volts (minimum voltage $V_{D(L)}$) and +380 volts (maximum voltage $V_{D(H)}$. In the drawing, periods of the minimum and maximum voltages $V_{D(L)}$ and $V_{D(H)}$ are indicated by $T_1$ and T2, respectively. For example, a duty ratio provided by the following equation is set to be 50%, for example.

$$\text{Duty Ratio}=100\cdot T1/(T1+T2)$$

According to an image forming method in which an image portion of the electrostatic latent image is formed by the irradiation of the associated image light, the voltage $V_1$ of the image portion of the electrostatic latent image is lower that a voltage $V_0$ of the non-image portion of the electrostatic latent image. For example, the voltage $V_1$ of the image portion is set to be −20 volts and the voltage $V_0$ of the non-image portion is set to be −450 volts.

When the developing voltage $V_D$ has the minimum voltage $V_{D(L)}$, a supply electric field is formed between the supplying roller 36 and the photosensitive member 4. When the developing voltage $V_D$ has the maximum voltage value $V_{D(H)}$, a collection electric field is formed between the supplying roller 36 and the photosensitive member 4. Although the supply and collection field can be formed in the image and non-image portions of the electrostatic latent image, the toner particles on the developing roller 36 are transferred only to the image portion of the electrostatic latent image since the supply field is stronger than the collection field in the image portion of the electrostatic latent image and the collection field is stronger than the supply field in the non-image portion.

The discharge bias $V_{RB}$ is controlled in accordance with the temperature and humidity environment in which the image forming apparatus 2 is installed.

For example, under the high temperature and high humidity environment (hereinafter referred to as "HH environment") the discharge voltage $V_R$ is set to be the same as the developing voltage $V_D$, so that no discharge bias $V_{RB}$ is applied to the conductive member 52 as shown in FIG. 4, because the toner has a relatively large amount of moisture and a relatively less amount of electricity and this ensures a sufficient scraping ability without any application of the discharge bias $V_{RB}$.

Under the neutral temperature and neutral humidity environment (hereinafter referred to as "NN environment") the discharge bias $V_{RB}$ is applied to the conductive member 52 as shown in FIG. 5. In this instance, the discharge bias $V_{RB}$ is applied in synchronization with the change of the developing voltage $V_D$ only when the developing voltage $V_D$ takes the minimum voltage $V_{D(L)}$. The discharge bias $V_{RB}$ in the NN environment is set to be 50 volts, for example, so that the toner scraping ability is increased to some extent.

Under the low temperature and low humidity environment (hereinafter referred to as the "LL environment") the discharge bias $V_{RB}$ is applied in synchronization with the change of the developing bias $V_D$ only when the developing voltage $V_D$ has the minimum voltage value $V_{D(L)}$. The discharge bias $V_{RB}$ in the LL environment is set to be 100 volts, for example, to ensure an enhanced scraping ability.

Although the discharge bias $V_{RB}$ is not limited to those described in NN environment and LL environment, respectively, the effective value of the discharge bias is preferably set to 5 volts or more but smaller than 300 volts.

Figure 6:
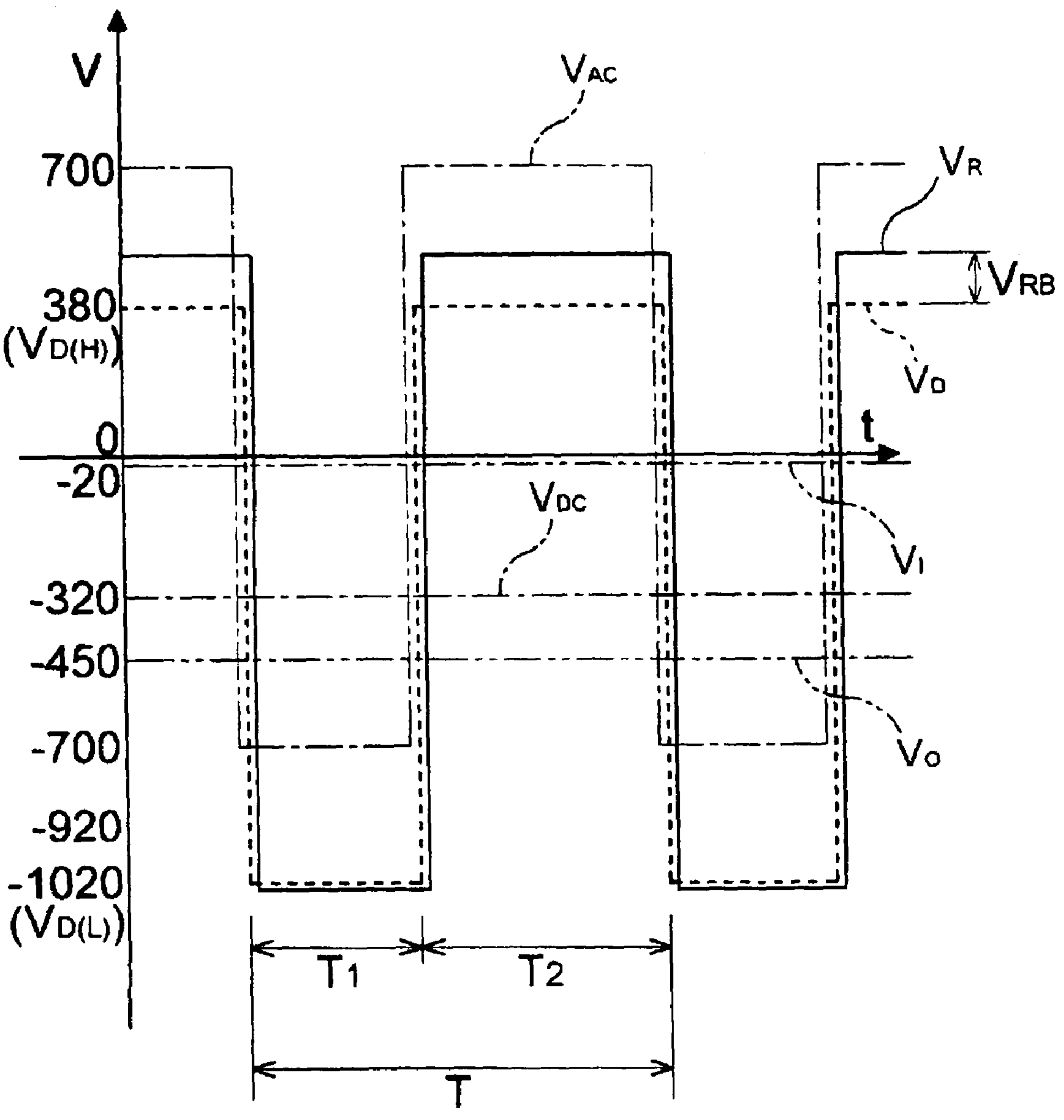
FIG. 6 is a diagram showing a graph of the discharge bias $V_R$ when the developing voltage $V_D$ takes the maximum voltage value $V_{D(H)}$.

Also, although FIG. 5 shows that the discharge bias $V_{RB}$ is applied only when the developing voltage $V_D$ takes the minimum voltage $V_{D(L)}$, it may also be applied when the developing voltage $V_D$ takes the maximum voltage $V_{D(H)}$ as shown in FIG. 6.

Figure 7:
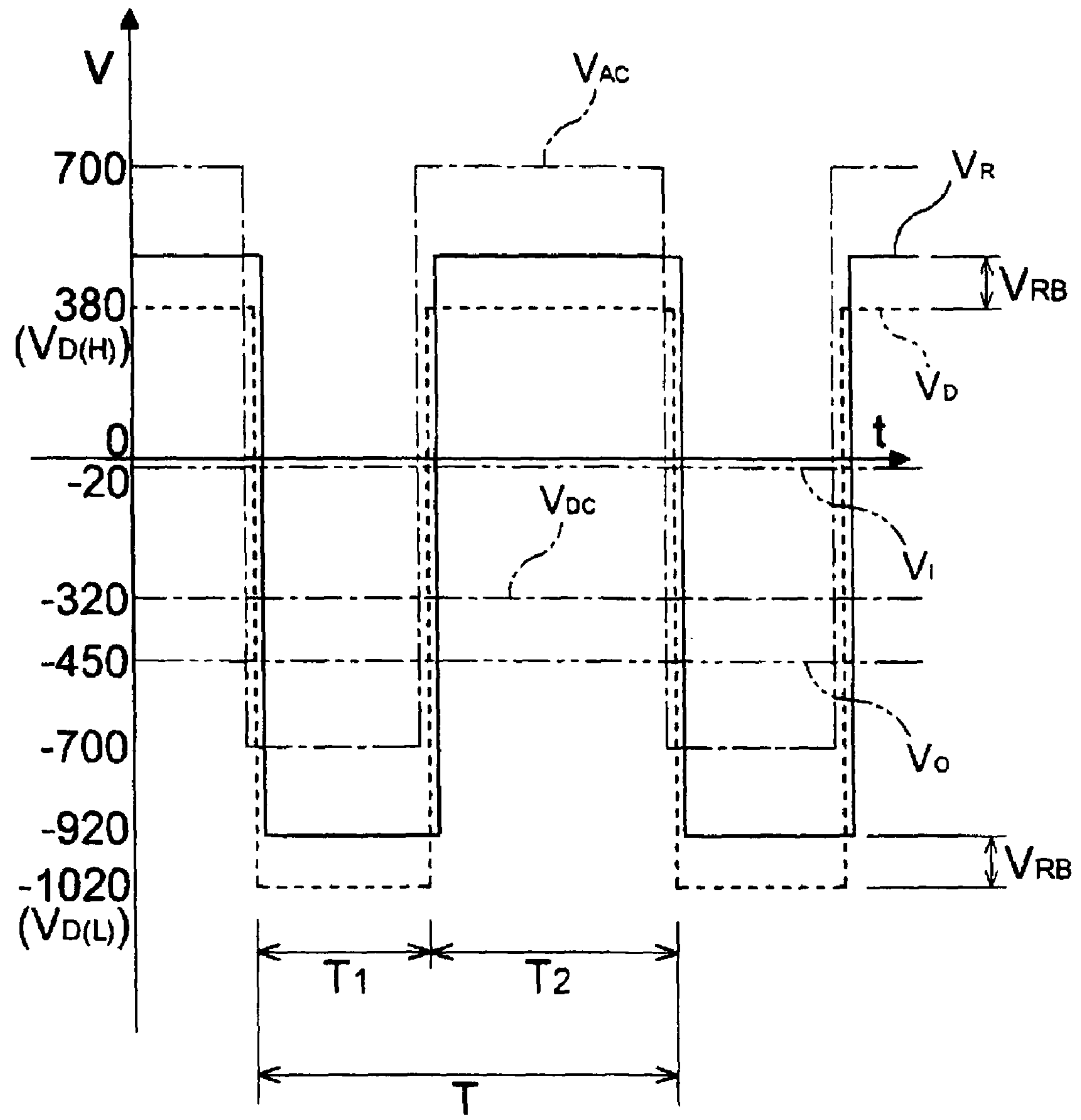
FIG. 7 is a diagram showing a graph of the discharge voltage $V_R$ when the developing voltage $V_D$ alternately takes the minimum voltage $V_{D(L)}$ and the maximum voltage $V_{D(H)}$.

Further, although the discharge bias $V_{RB}$ is applied when the developing voltage $V_D$ takes either the minimum voltage $V_{D(L)}$ or the maximum voltage $V_{D(H)}$ as indicated in FIGS. 5 and 6, the discharge bias $V_{RB}$ may be applied both when the developing voltage $V_D$ takes the minimum voltage value $V_{D(L)}$ and when the developing voltage $V_D$ takes the maximum voltage $V_{D(H)}$ as shown in FIG. 7.

Figure 8:
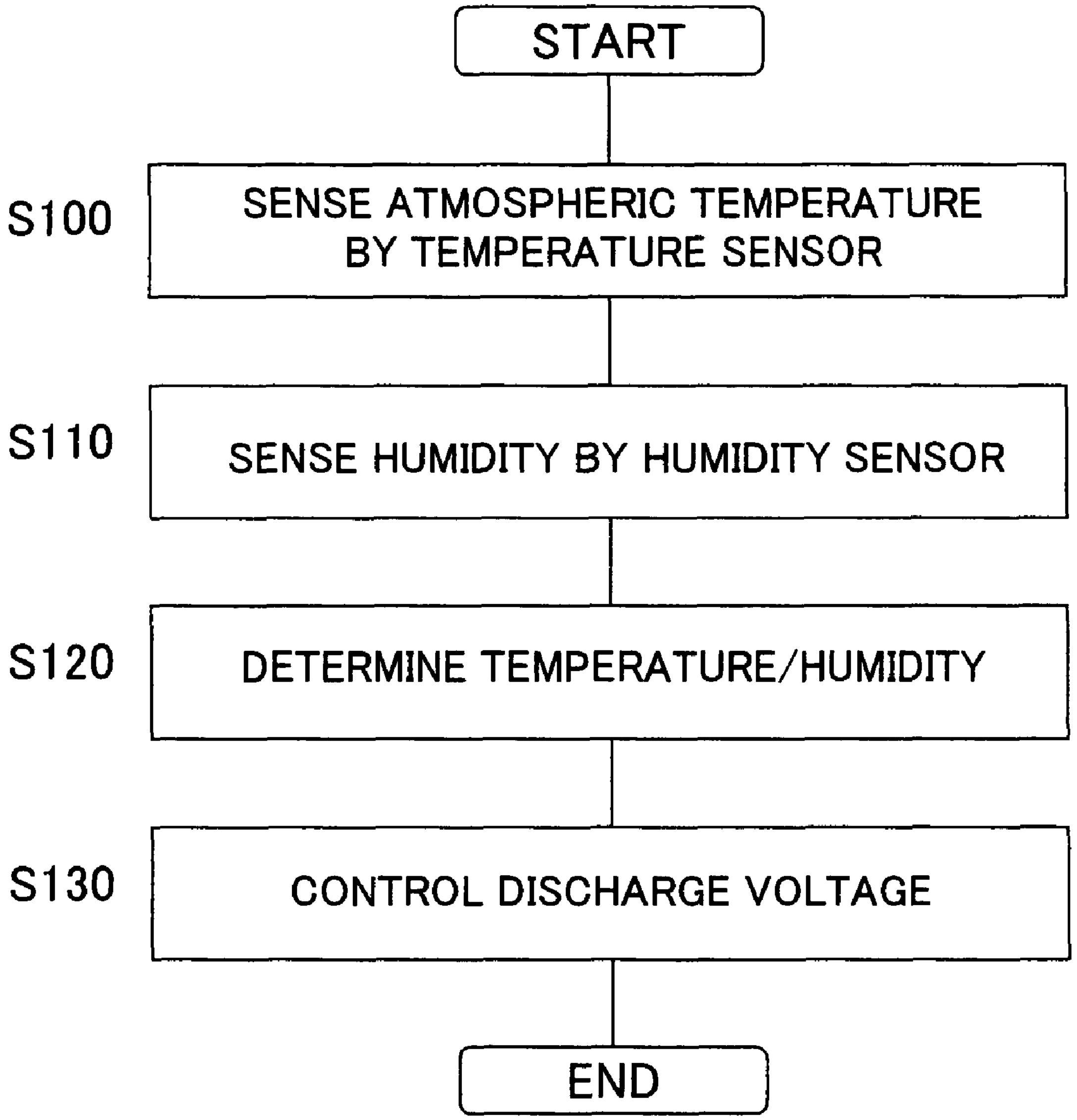
FIG. 8 is a diagram showing a flow chart showing a process for controlling the value of the discharge bias.

Referring to FIG. 8, discussions will be made to the control of the discharge bias $V_{RB}$ in different temperature/humidity environments.

The drawing shows process flows which would be executed regularly or immediately before or after the image forming operation. The process starts at Step 100 where the temperature sensor 60 senses the atmospheric temperature inside the image forming apparatus 2.

At Step 110, the humidity sensor 62 senses the humidity inside the image forming apparatus 2. The process at Step 110 may be executed before the process at Step 100.

At Step 120, based on the information indicating the temperature and humidity sensed at Step 100 and Step 110, respectively, the controller 64 determines the discharge bias $V_{RB}$ corresponding to HH, NN, or LL environment.

At Step 130, the controller 64 controls the discharge voltage $V_R$ in accordance with the temperature and humidity environment determined Step 120. In this process, the developing bias $V_D$ is maintained constant and the discharge voltage $V_R$ is controlled to provide the $V_{RB}$ in accordance with the temperature and humidity environments.

EXAMPLES

Test 1

16 samples, made of materials with different properties, i.e., samples 1-4 according to the present invention (hereinafter each referred to as "Invention Example") and samples 1-12 (hereinafter each referred to as "Comparison Example"), were prepared and tested for evaluation of their capabilities. Each of 16 samples included polyurethane foam material as a base material. The air permeability, the hardness, and the average cell density of each sample were measured. The measurement result is shown in FIG. 9.

The air permeability was measured in accordance with JIS-L1096A under a differential pressure of 125 Pa, using Frazier Air Permeability Tester.

The hardness was measured in accordance with JIS-K6400. In this measurement, samples each having the size of 50×390×390 mm were prepared and placed on a fixed base in the stress-strain measuring system. The samples were compressed with an initial load of 4.9 N. A circular plate having a diameter of 200 mm was placed on the initially compressed samples. Then, the samples were further compressed by 75% of their original thicknesses. The compression force was removed. Again, the samples were again compressed by 25% of the original thicknesses, in which the compression force was measured after 20 second from the completion of the second compression.

The average cell density was measured by counting the number of cells existing within 25 mm width using the magnifying glass. The counting was made in three fields and the average density cells were obtained.

The characteristics of each sample were evaluated in terms of cracking of toner particles, the implantation of the additive into toner particles, the scraping ability and the dropping of toner particles.

For this purpose, toner supplying rollers using the respective samples as foam layers were prepared. A method of fabricating the toner supply rollers with foam layers will be described. Specifically, the samples were cut into rectangles each having a size of 40×40×300 mm. For each sample, a bore having a diameter of 6 mm was formed for insertion of the metal bar. A hot melt adhesive was applied on the peripheral surface of each metal bar by using a roll coater. The resultant metal bar had an outer diameter of 8 mm and was inserted into the bore of the sample. Then, the metal bar was heated by an electro-magnetic induction heater to melt the adhesive for providing a better bonding between the metal bar and the surrounding foam layer. Subsequently, the metal bar was cooled. Finally, each foam sample was cut to have an outer diameter of 14.8 mm.

In particular, for the sample of Invention Example 2, before bonding the sample and the core, electrically conductive carbon was added into the polyurethane foam by immersing the sample into a liquid of resin in which electrically conductive carbon was dispersed, compressed by two rollers, and then dried.

The cracking and the implantation or adhering ability of the used toner particles was evaluated as follows. A toner cartridge for Magicolor 7300 (manufactured by Konica Minolta Business Technologies, Inc.) was prepared for the developing device. Also, an external drive machine for driving the developing device was assembled only for this evaluation. The external drive machine was adjusted so as to rotate the developing and supply rollers at rotational speeds of 140 rpm and 155 rpm, respectively. No voltage was applied between the developing roller and the supply roller so that they had the same electric potential. Each sample roller was assembled into the developing device. The developing device was loaded with 50 grams of magenta toner for Magicolor 7300. The developing device was driven continuously for four hours. Then, the developing device was disassembled and the toner particles were removed.

The removed toner was observed by the scanning electron microscope (SEM) in terms of the cracking and the implantation. For the toner cracking, 500 toner particles were observed and the number of cracked toners was counted. The result is shown in FIG. 9, in particular at column of "Toner Cracking", in which symbols "A" and "B" indicate that the number of cracked toner particles were equal to or less than two and equal to or more than three, respectively. For the implantation, the number of additives borne on the toner particles were counted. The result is shown in FIG. 9, in particular at column of "Implantation", in which symbols "A" and "B" indicate that the number of external additive particles was more than and less than half of the original number of implanted additives, respectively.

The toner clogging was evaluated. In this evaluation, the weight W1 of the sample cut into a rectangle having the size of 20×20×20 mm was measured. This sample was mixed with 120 grams of toner in a plastic bottle having the capacity of 500 ml for 30 minutes. The sample was taken from the bottle and its weight W2 was measured. Then, the sample was placed in another plastic bottle having the capacity of 500 ml and shaken for 15 minutes. The sample was taken out of the bottle and its weight W3 was measured.

Subsequently, a remaining ratio was calculated by the following equation:

$$\text{Remaining Ration }(\%)=100\cdot(W3-W1)/(W2-W1)$$

The result is shown in FIG. 9, in particular at column of "Clogging", in which symbols "A", "B", and "C" indicate that the calculated remaining ratio was equal to or less than 35%, more than 35% but equal to or less than 40%, and more than 40%, respectively.

The scraping ability was evaluated as follows. A toner cartridge for Magicolor 7300 (manufactured by Konica Minolta Business Technologies, Inc.) was prepared for the developing device. Also, an external drive machine for driving the developing device was assembled only for this evaluation. The external drive machine was adjusted so as to rotate the developing and supply rollers at rotational speeds of 140 rpm and 155 rpm, respectively. No voltage was applied between the developing roller and the supply roller so that they had the same electric potential. Each sample roller was assembled into the developing device. The remaining toner particles on the developing roller were removed by the use of compressed air and then wiped off completely by cloth. The developing device was loaded with 50 grams of magenta toner for Magicolor 7300.

The developing device was switched on and then immediately off so that the developing roller and the supply roller made a single rotation. The toner particles on the developing roller retained by the rotation were sampled. Hereinafter, the sampled toner is referred to as "toner sample A". Next, the developing device was driven for 30 seconds and then the toner particles on the developing roller were sampled. Hereinafter, the sampled toner is referred to as "toner sample B".

For samples A and B, a volume particle size distribution was measured using FPIA-2100 (manufactured by Sysmex Corporation). The particle size distribution serves as an indicator which expresses at which rates particles having which diameters are contained (i.e., relative particle weights to the total of 100%).

The particle size distribution of the toner samples A and B were respectively replaced with cumulative distributions indicative of a percentage ratio of the particles having a particular particle diameter or larger diameters.

Ten particle diameter levels were set and numbered from the first level to the tenth level, starting with the smallest one. With reference to the first particle diameter level, a particle size distribution value representing the first rotation was defined $X_1$ and a particle size distribution value after thirty seconds was defined $Y_1$, whereas with reference to the n-th particle diameter level, a particle size distribution value representing the first rotation was defined Xn and a particle size distribution value after thirty seconds was defined Yn. As for points Pn (Xn, Yn) thus defined, namely, $P_1$ through $P_{10}$ a standard SN ratio was calculated by a known formula for standard SN ratio calculation.

The standard SN ratio expresses a ratio between a signal (S: signal) and an error (N: noise) as a digital value, and the larger a standard SN ratio value is, the smaller an error is. In other words, as the value of the standard SN ratio calculated as described above is increased, changes of the first-round particle size distribution and the particle size distribution after thirty seconds become smaller.

With poor scraping ability of the supply roller, the toner replacement on the developing roller is unlikely to occur frequently, which results in that the toner particles having small diameters in particular tend to remain adhered to and staying on the developing roller. This increases the proportion of small diameter particles to the toner. As a result, the particle size distribution of toner samples A and B greatly change and the value of the SN ratio decreases. On the contrary, with improved scraping ability of the supply roller, the particle size distributions of samples A and B change slightly and the value of the SN ratio increases.

In light of this, the scraping ability was evaluated in terms of a standard SN ratio value. The result is indicated in FIG. 9 at column "Scraping ability", in which symbols "A", "B", "C" mean that SN ration were equal to or more than 27 db, more than 25 db but less than 27 db, and less 25 db, respectively.

The stability of toner supply was evaluated as follows. A toner cartridge for Magicolor 7300 (manufactured by Konica Minolta Business Technologies, Inc.) was prepared for the developing device. Each sample roller was assembled into the developing device. The developing device was loaded with 50 grams of magenta toner for Magicolor 7300. Then, the printing was made using the image forming apparatus with the developing device installed and observed the existence of the thin spot and the image defects. The result is shown in FIG. 9, in particular at column "Stability", in which symbol "A" indicates that no thin-spot or defect was observed and symbol "B" indicates that thin-spot and/or defect was observed.

The test results in FIG. 9 show following facts. The samples of Comparative Examples 1, 3, 7, and 9 with air permeabilities of less than 120 $ml/cm^2/s$ caused clogging. The samples of Comparative Examples 4 and 11 with air permeabilities exceeding 200 $ml/cm^2/s$ exhibited poor supplying stability.

The samples of Comparative Examples 2 and 10 with hardness of less than 50 N exhibited poor supplying stability. The samples of Comparative Examples 3, 9, and 12 with hardness exceeding 200 N caused toner cracking.

The samples of Comparative Examples 4, 5, and 10 with average cell densities less than 30 cells per 25 mm width exhibited poor scraping abilities. The samples of Comparative Examples 1, 3, 6, and 8 with average cell density of more than 40 cells per 25 mm width exhibited the implantations of the external additives into the toner. Also, the samples of Comparative Examples 3 and 6 with higher cell densities caused toner cracking.

In view of foregoing, it was confirmed that the foam layer of the supply roller preferably has air permeability of from 120 $ml/cm^2/s$ to 200 $ml/cm^2/s$, hardness of from 50 N to 200 N and the average cell density of from 30 cells/25 mm to 40 cells/25 mm. For example, the samples of Invention Examples 1 through 4 which meet all of those conditions exhibited good results in all aspects.

Test 2

The scraping ability of the foam layer was evaluated with no application of discharge bias in HH, NN, and LL environments, with discharge bias of 50 volts applied in NN environment, and with discharge bias of 100 volts applied in LL environment.

The sample of Invention Example 2 in Test 1 was used for the foam layer. For HH environment, the atmospheric temperature was set to 30 degrees Celsius and the humidity was set to 85%. For NN environment, the atmospheric temperature was set to 23 degrees Celsius and the humidity was set to 65%. For LL environment, the atmospheric temperature was set to 10 degrees Celsius and the humidity was set to 15%. The discharge bias was applied in synchronization with the change of the developing bias when the developing bias had the minimum voltage value as shown in FIG. 5.

The scraping ability was evaluated in terms of a standard SN ratio value as described in Test 1. The result is shown in FIGS. 10A and 10B, in which symbols "A", "B", "C" and "D" mean that SN ration were equal to or more than 29 db, equal to or more than 27 db but less than 29 db, equal to or more than 25 db but less than 27 db, and less 25 db, respectively.

As shown in FIG. 10, the scraping ability of the foam layer in HH environment was remarkably favorable even without application of the discharge bias. The scraping ability of the foam layer in NN environment was favorable without any application of the discharge bias, and it is further improved by the application of the discharge bias of 50 volts when the developing bias took the minimum voltage. The scraping ability of the foam layer in LL environment, although somewhat poor without application of the discharge bias, was remarkably favorable with the discharge bias of 100 volts when the developing bias took the minimum voltage value.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A developer supply roller, comprising:

an outer circumferential foam layer made of resin or rubber, the foam layer having an air permeability of 150-200 $ml/cm^2/s$, a hardness of 50-200 Newtons, and an average cell density of 20-40 per 25 mm width.

2. The developer supply roller of claim 1, wherein the foam layer is made of polyurethane foam.

3. The developer supply roller of claim 1, wherein the foam layer includes a number of small neighboring cells, each of the cells having an average effective diameter of 300-1200 μm.

4. The developer supply roller of claim 1, wherein the air permeability of the foam layer is 150-180 $ml/cm^2/s$.

5. The developer supply roller of claim 1, wherein the hardness is 50-100 Newtons.

6. A developing device, comprising:

a developer bearing member;

a housing adapted to accommodate a developer; and a supply roller adapted to supply the developer within the housing for the developer bearing member, the supply roller having an outer circumferential foam layer made of resin or rubber, the foam layer having an air permeability of 150-200 $ml/cm^2/s$, a hardness of 50-200 Newtons, and an average cell density of 20-40 per 25 mm width.

7. The developing device of claim 6, wherein the foam layer is made of polyurethane foam.

8. The developing device of claim 6, wherein the foam layer includes a number of small neighboring cells, each of the cells having an average effective diameter of 300-1200 μm.

9. The developing device of claim 6, wherein the air permeability of the foam layer is 150-180 $ml/cm^2/s$.

10. The developing device of claim 6, wherein the hardness is 50-100 Newtons.

11. An image forming apparatus, comprising:

an electrostatic latent image bearing member capable of bearing an electrostatic latent image thereon; and a developing device having a developer for visualizing the electrostatic latent image into a visualized image, the developing device comprising:

a developer bearing member;

a housing adapted to accommodate the developer; and a supply roller adapted to supply the developer within the housing for the developer bearing member, the supply roller having an outer circumferential foam layer made of resin or rubber, the foam layer having an air permeability of 150-200 ml/$cm^2$/s, a hardness of 50-200 Newtons, and an average cell density of 20-40 per 25 mm width.

12. The image forming apparatus of claim 11, further comprising a discharge member disposed in contact with the developer bearing member and capable of discharging the developer on the developer bearing member; and a discharge bias source capable of applying a discharge bias, the discharge bias having a polarity different from that of an electric charge that the developer would be charged.

13. The image forming apparatus of claim 12, further comprising a temperature sensor capable of sensing an atmospheric temperature inside the image forming apparatus;

a humidity sensor capable of sensing a humidity insider the image forming apparatus; and a controller capable of controlling the discharge bias based upon the temperature sensed by the temperature sensor and the humidity sensed by the humidity sensor.

14. The image forming apparatus of claim 11, wherein the foam layer is made of polyurethane foam.

15. The image forming apparatus of claim 11, wherein the foam layer includes a number of small neighboring cells, each of the cells having an average effective diameter of 300-1200 μm.

16. The image forming apparatus of claim 11, wherein the air permeability of the foam layer is 150-180 ml/$cm^2$/s.

17. The image forming apparatus of claim 11, wherein the hardness is 50-100 Newtons.

* * * * *